(12) United States Patent
Carlson et al.

(10) Patent No.: US 7,389,912 B2
(45) Date of Patent: Jun. 24, 2008

(54) METHOD AND SYSTEM FOR CREATING BANKING SUB-ACCOUNTS WITH VARYING LIMITS

(75) Inventors: Michael Pierre Carlson, Austin, TX (US); Herman Rodriguez, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 227 days.

(21) Appl. No.: 11/204,416

(22) Filed: Aug. 16, 2005

(65) Prior Publication Data

US 2007/0040015 A1 Feb. 22, 2007

(51) Int. Cl.
G06Q 40/00 (2006.01)
G07D 11/00 (2006.01)
G07F 19/00 (2006.01)

(52) U.S. Cl. .......................... 235/379; 235/380; 705/35

(58) Field of Classification Search ................. 235/379, 235/380; 705/26, 35, 40
See application file for complete search history.

(56) References Cited

U.S. PATENT DOCUMENTS

| | | | |
|---|---|---|---|
| 4,689,018 A | 8/1987 | Trinity | |
| 6,038,552 A | 3/2000 | Fleischl et al. | |
| 6,353,811 B1* | 3/2002 | Weissman | 705/40 |
| 2002/0143647 A1* | 10/2002 | Headings et al. | 705/26 |
| 2005/0102188 A1* | 5/2005 | Hutchison et al. | 705/26 |
| 2005/0261984 A1* | 11/2005 | Hutchison et al. | 705/26 |
| 2006/0004659 A1* | 1/2006 | Hutchison et al. | 705/40 |
| 2006/0242041 A1* | 10/2006 | Canney | 705/35 |
| 2007/0203853 A1* | 8/2007 | Gindi | 705/80 |

* cited by examiner

*Primary Examiner*—Uyen-Chau N Le
(74) *Attorney, Agent, or Firm*—Janis E. Clements

(57) ABSTRACT

A system for providing credit card sub-accounts with varying credit limits is useful to consolidate many accounts into one account. The present invention allows a user to add others to an existing account with the safety of setting credit limits for each sub-account to prevent sub-account holders from abusing the user's account features, funds, credit limits, and the like. Credit limits for sub-accounts can be configured by an exact amount, a percentage of the total credit limit, a percentage of the credit available, or a combination of these methods, and can also be per transaction, type of establishment where transaction takes place, or types of products or services attempting to be purchased.

3 Claims, 7 Drawing Sheets

Bank X

New Balance     Minimum Amount Due
$6,000           $100

Credit Line Summary on 6/1/05
| Total Credit Line | Account A | Sub-Account B | Sub-Account C | Sub-Account D |
|---|---|---|---|---|
| $10,000 | $5,000 | $2,000 | $2,500 | $500 |

Activity
| | | | |
|---|---|---|---|
| 5/19/05 | Sub-Account C | College Bar | ($10) |
| 5/20/05 | Sub-Account C | UT Bookstore | $300 |
| 5/20/05 | Sub-Account B | Office Supply Store | $1150 |
| 5/22/05 | Sub-Account A | Clothing Store | $2000 |
| 5/24/05 | Sub-Account C | Travel Agent | $2100 |
| 5/25/05 | Sub-Account D | Stereo Shop | $400 |
| 5/25/05 | Sub-Account D | Record Store | $50 - Transaction Denied- |

Total of New Activity     New Charges   $6,000
                       Available Credit   $4,000

FIG. 3

METHOD AND SYSTEM FOR CREATING BANKING SUB-ACCOUNTS WITH VARYING LIMITS

TECHNICAL FIELD

The present invention relates to providing banking or credit card sub-accounts and particularly to allow an account holder or user to consolidate transactions for an account and its associated sub-accounts.

BACKGROUND OF RELATED ART

In the current art relating to banking and credit card accounts, an account holder may have a savings account and a checking account with one bank, a mortgage account with another bank, and multiple credit card accounts with multiple providers. The account holder may have additional banking and credit card accounts for dependents, resulting in many statements that need balancing and many transactions for the account holder to monitor. Further, in the current art, an account holder with ample funds wanting to establish a credit card account for a dependent has only the options of either opening a separate credit card account which must be managed and reconciled as a separate account, or adding the dependent to the account holder's existing account as a joint account holder with full access to all features, funds, credit limits, and the like, of the user. This creates a burden on the account holder in managing various accounts. A method and system to provide ease of use of banking and/or credit card accounts is needed.

SUMMARY OF THE PRESENT INVENTION

The present invention provides a computer implemented method and system for creating banking sub-accounts associated with an account holder's existing account allowing an account holder to more efficiently manage various credit card or banking accounts by consolidating transactions for sub-accounts and their associated account. One aspect of the present invention offers an account holder or user the ability to limit access to a credit card spending limit or balance on an account, to limit the types of establishments where the sub-account can be used, or the types of products that can be purchased. Another aspect of the present invention enables creation of banking sub-accounts associated with an existing account, creation of at least one banking sub-account, and consolidation of transactions for said at least one sub-account and said account. In another aspect of the present invention, the creation of sub-accounts can be accomplished by an account holder or user or can be performed on behalf of the account holder or user. The present invention further comprises configuring at least one transaction limit for the at least one banking sub-account. Said limits could be configured as an exact amount, a percentage of the total credit limit on a credit card, a percentage of the credit or balance available in the account on the credit card, or a combination of various configuration methods. The transaction limit can be configured on a per transaction basis, on the sum of all transactions in a sub-account, or a combination of each, e.g. user A has access to 10% of the total limit, but each individual transaction cannot be greater the $50. The transactions are stored for said account holder and for sub-account holder. The stored transactions are presented to the account holder and sub-account holder either through regular mail, electronic means, such as E-mail, or some other method such as by pager, PDA, cellular telephone, or the like.

BRIEF DESCRIPTION OF THE DRAWINGS

The present invention will be better understood and its numerous objectives and advantages will become more apparent to those skilled in the art by reference to the following drawings, in conjunction with the accompanying specification, in which:

FIG. 3 is an illustrative diagram of an interactive display interface used for the electronic presentation of transaction information of the present invention;

DETAILED DESCRIPTION OF THE PREFERRED EMBODIMENT

Before going into the details of specific embodiments, it is helpful to understand from a more general perspective the various elements and methods that may be related to the present invention. Since one aspect of the present invention is directed to E-mail or like documents transmitted over networks, an understanding of networks and their operating principles would be helpful. Reference has also been made to the applicability of the present invention to a global network, such as the Internet or Web. The Internet or Web is a global network of a heterogeneous mix of computer technologies and operating systems. Higher level objects are linked to the lower level objects in the hierarchy through a variety of network server computers. E-mail is distributed through such a network. For details on Internet nodes, objects and links, reference is made to the text, *Mastering the Internet*, G. H. Cady et al., published by Sybex Inc., Alameda, Calif., 1996.

Figure 1:
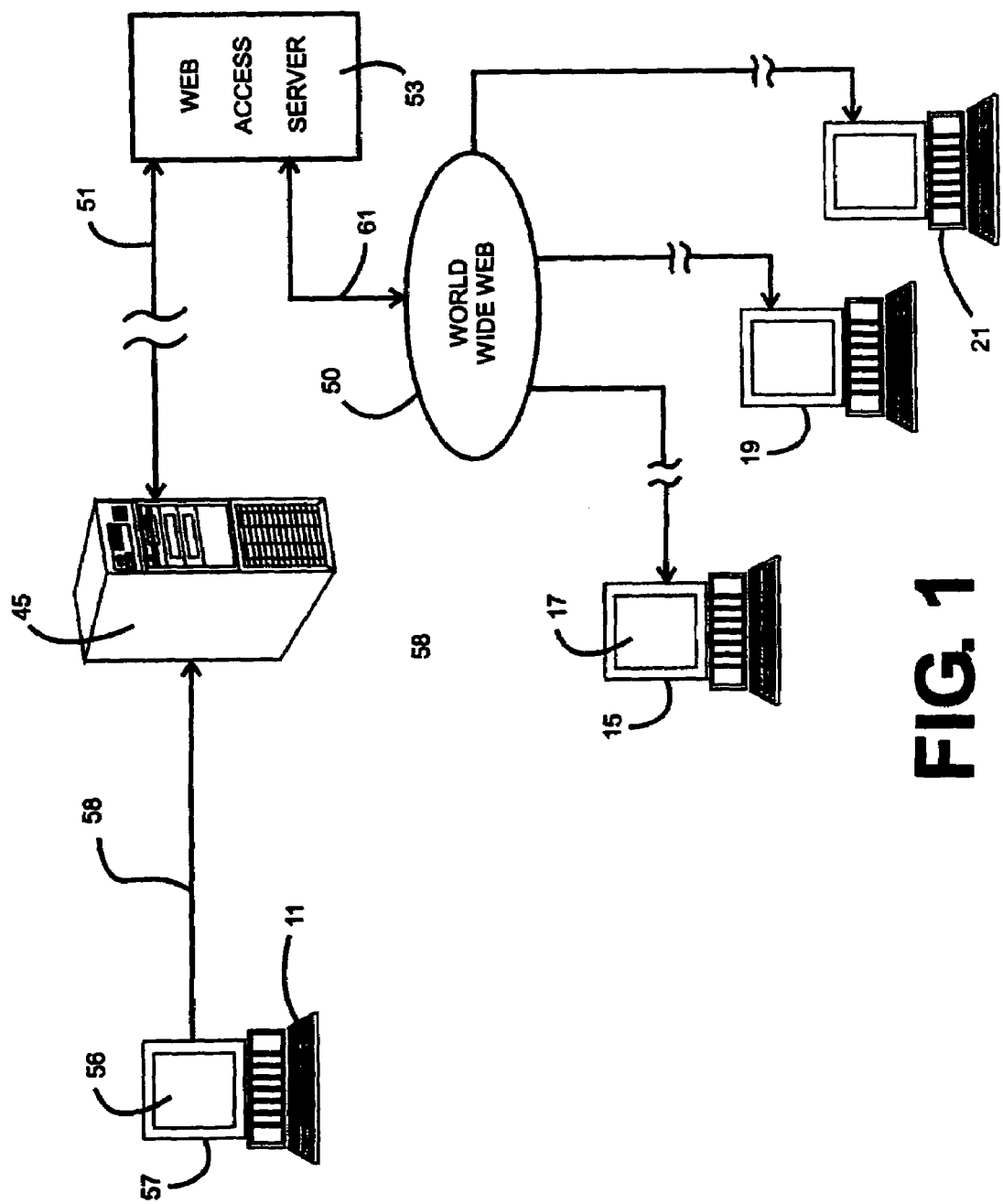
FIG. 1 is a generalized view of an E-mail distribution system in a Web or Internet environment that may be used in the practice of this invention.

A generalized diagram of a portion of the Web for illustration of the electronic (e.g., E-mail) distribution system of the present invention is shown in FIG. 1. The computer controlled display terminal 11 has a display 57 upon which E-mail documents 56 or other similar account information documents may be created by a sending system and displayed. Terminals 11 and 15 may be implemented by the computer system set up in FIG. 2, and connection 58 (FIG. 1) is the network connection shown in FIG. 2. For purposes of the present embodiment, terminal 11 serves as a Web display station for the sending of E-mail or like account information documents via the display interfaces to be described with respect to FIGS. 3 through 7 via E-mail programs. Reference may be made to the above-mentioned *Mastering the Internet*, pp 136-147, for typical connections between local display stations to the Web via network servers, any of which may be used to implement the system on which this invention is used. In the typical set up shown, terminals are connected via, for example, host dial connections (not shown) to server 45 provided by a Web Service Provider that in turn accesses the Web 50 via connection 51 to a Web access server 53 and connection 61. For the purpose of this embodiment, creation and presentation of account information occurs on sending system's terminal 11, and account information, such as preset limits and any restrictions, is stored on an account database. Account information documents or E-mail 56 are automatically generated and sent over the Web 50 to receiving terminals 15, 19, or 21, which can be an account holder 15, and two sub-account holders, e.g. the account holder's college-aged child 19 and the account holder's high school-aged child 21. The account holder can also opt to be the only recipient of account information for the account and sub-accounts. Account holder can specify another sub-account recipient.

Figure 2:
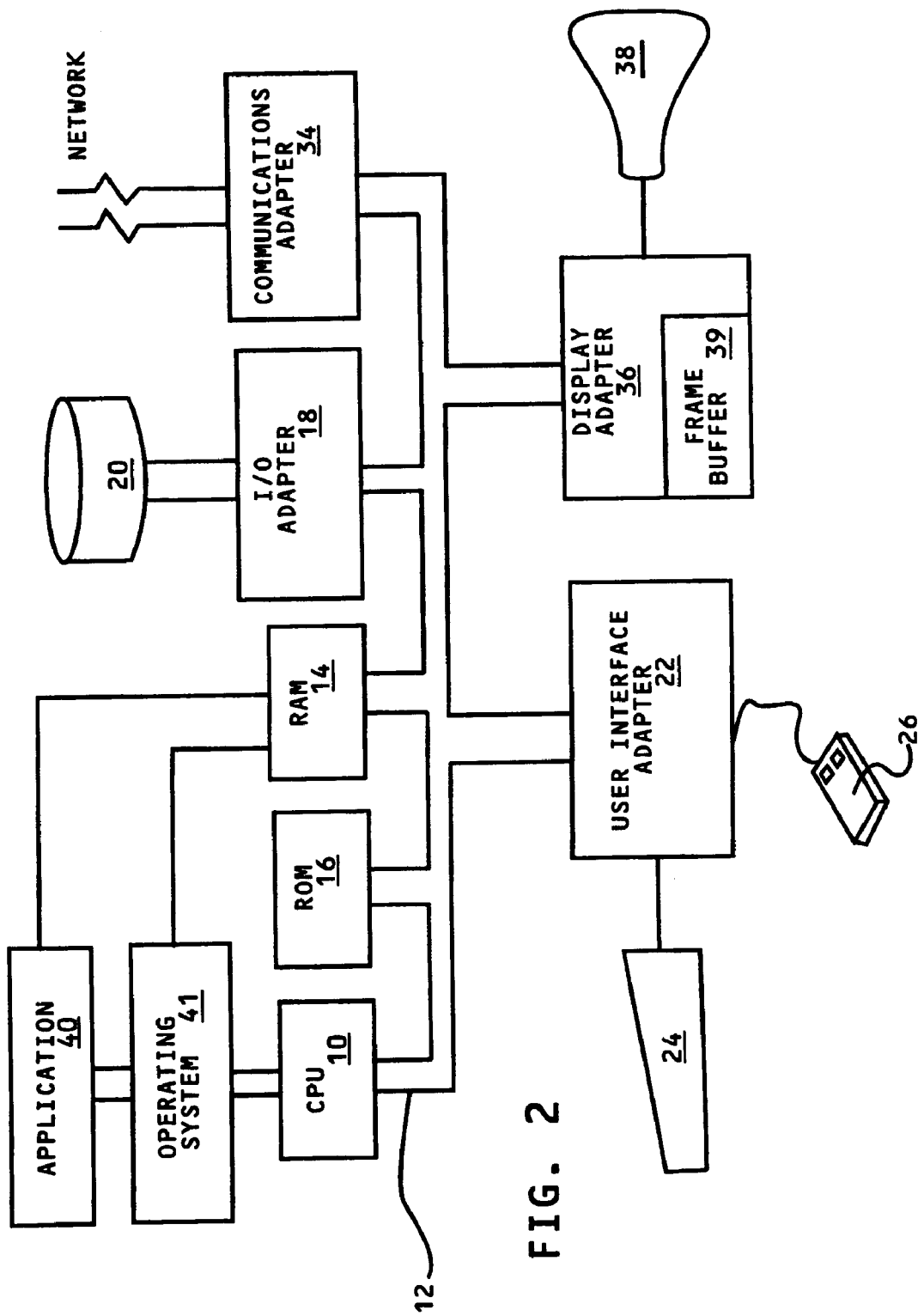
FIG. 2 is a block diagram of a generalized data processing system on which the present invention for providing credit card sub-accounts may be practiced.

Referring to FIG. 2, a data processing system is shown which may function as the computer network terminal or Web station used as any of the sending or receiving Web stations for electronic mail transmission or other transmission for the creation and management of sub-accounts, and the presentation of sub-account transaction information to an account holder of the present invention; the system shown is also illustrative of any of the server computers used for the Web E-mail distribution to be described in greater detail with respect to FIG. 1.

A central processing unit (CPU) 10, may be one of the commercial microprocessors in personal computers available from International Business Machines Corporation (IBM), or Dell Corporation; when the system shown is used as a server computer at the Web distribution site, to be subsequently described, then a workstation is preferably used, e.g. RISC System/6000™ (RS/6000) series available from IBM. The CPU 10 is interconnected to various other components by system bus 12. An operating system 41 runs on a CPU 10, provides control and is used to coordinate the functions of the various components of FIG. 2. Operating system 41 may be one of any commercially available operating systems, such as IBM's AIX 5L™ operating system; Microsoft Windows XP™; or Windows2000™, as well as other UNIX and AIX, or custom operating systems. Application programs 40, controlled by the system, are moved into and out of the main memory Random Access Memory (RAM) 14. These programs include the programs of the present invention for providing credit card sub-accounts, comprising enabling creation of credit card sub-accounts associated with an existing account, creating at least one credit card sub-account, and consolidating transactions for said at least one sub-account and said account. A Read Only Memory (ROM) 16 is connected to CPU 10 via bus 12 and includes the Basic Input/Output System (BIOS) that controls the basic computer functions. RAM 14, I/O adapter 18 and communications adapter 34 are also interconnected to system bus 12. I/O adapter 18 communicates with the disk storage device 20. Communications adapter 34 interconnects bus 12 with the outside network enabling the computer system to communicate with other such computers over the Web or Internet. The latter two terms are meant to be generally interchangeable and are so used in the present description of the distribution network. I/O devices are also connected to system bus 12 via user interface adapter 22 and display adapter 36. Keyboard 24 and mouse 26 are all interconnected to bus 12 through user interface adapter 22. It is through such input devices that the user at a receiving station may interactively relate to the Web in order to access Web documents. Display adapter 36 includes a frame buffer 39, which is a storage device that holds a representation of each pixel on the display screen 38. Images may be stored in frame buffer 39 for display on monitor 38 through various components, such as a digital to analog converter (not shown) and the like. By using the aforementioned I/O devices, a user is capable of inputting information to the system through the keyboard 24 or mouse 26 and receiving output information from the system via display 38.

The creation of sub-accounts can be by the account holder or performed on behalf of the account holder, such as by a bank. At least one transaction limit can be configured for the at least one credit card sub-account and stored for the account holder. The stored transactions are presented to the account holder. Such presentation of account information can be via electronic means, such as E-mail, and can include notification by pagers, personal digital assistants, or the like. Where the computer system shown functions as the receiving Web station, then any conventional E-mail application program, such as Microsoft's Internet Explorer™, will be available for accessing E-mail from the Web and for sending E-mail to the Web from the network station.

In FIG. 3 there is illustrated an E-mail account information document 35 created by a sending system or terminal as shown in FIG. 2, e.g. E-mail on sending terminal 11. The sending terminal 11 can send regular E-mail statements containing account information 35, as well as notifications or alerts regarding the account and sub-account activities. The sending terminal 11 handshakes with a receiving terminal 21 and delivers the account information message 35 that contains information regarding the transactions of the account holder's account and its sub-accounts. For purposes of FIG. 3, the account holder's existing account is labeled as "Account A", and the sub-accounts are labeled as follows: "Sub-Account B" is account holder's business account; "Sub-Account C" is account holder's college-aged child; and "Sub-Account D" is account holder's high school-aged child. In FIG. 3, an example of an E-mail based presentation of account information is shown. The example in FIG. 3 is simplified to illustrate the account and sub-account limits, available credit, and transaction history for the month. In practice, a statement showing more detailed account information, such as each transaction for the account and each sub-account, would appear on the account information presented to the account holder. The account holder can place limitations on transactions attempted by the sub-account holders. For example, in FIG. 3, the account holder placed a limitation on transactions made by sub-account holders for the purchase of alcoholic beverages. As shown in the message 35 of FIG. 3, Sub-account holder "C" attempted to pay for a pitcher of beer at College Bar on May 19, 2005 with the sub-account credit card and the transaction was denied. A separate message 35 alert could be sent to account holder immediately after Sub-account holder C's attempt to violate the restriction of the transaction limitation informing account holder of the attempted transaction.

In FIG. 3, the entire account has a $10,000 credit limit. All sub-accounts in this example are configured with an exact amount for sub-credit limit, and not per transaction. However, in the present invention, sub-credit limits can be configured by an exact amount, a percentage of the total credit limit, a percentage of the credit or balance available, or a combination of these configuration methods. Also, limits can be set per transaction by use of other configuration methods. In this group, the non-business account credit limit is $5,000, and the business sub-account credit limit is $2,000. The college-aged child's sub-credit limit is $2,500, and the high school-aged sub-credit limit is $500.

Figure 4:
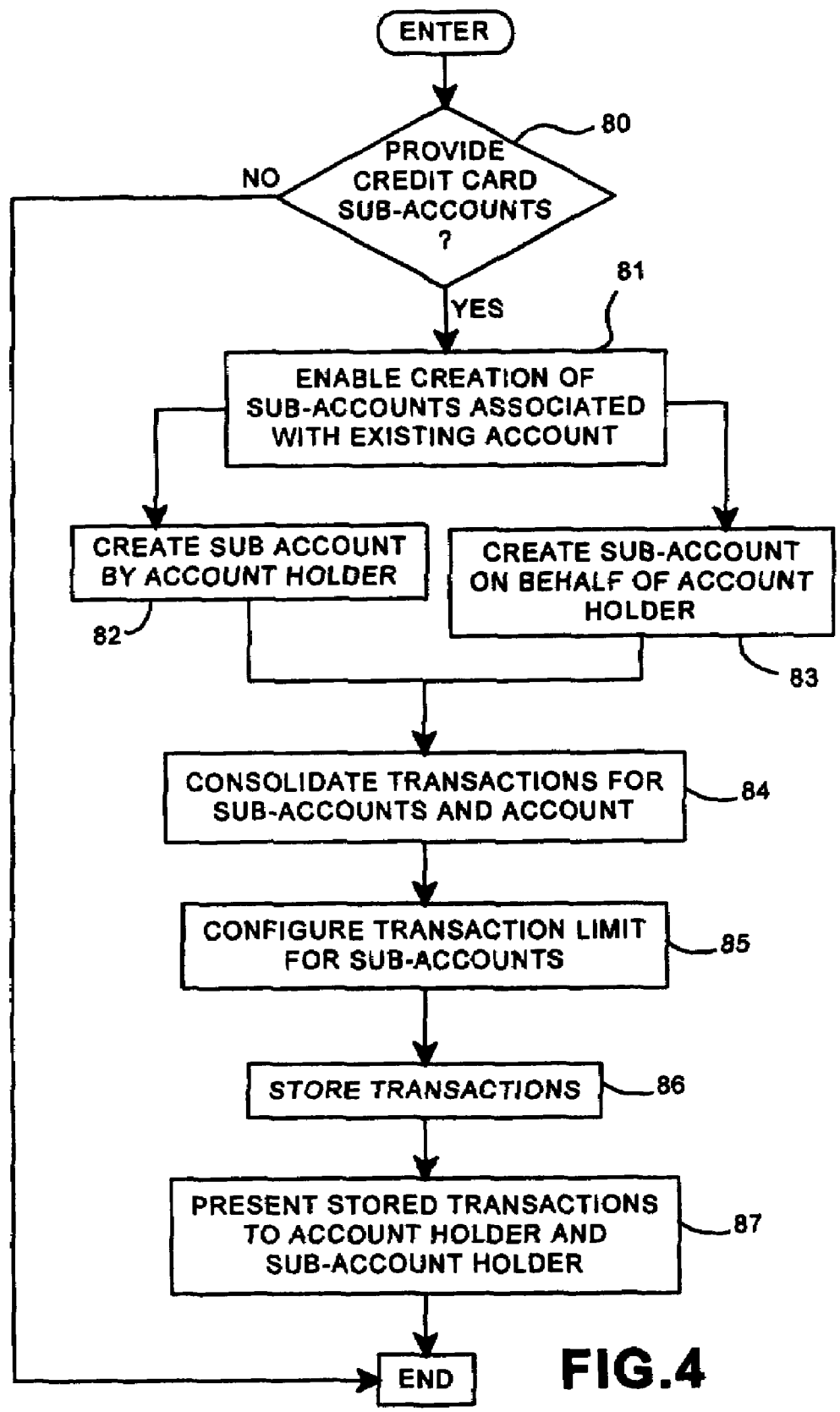
FIG. 4 is a flowchart of an illustrative generalized run of the program set up according to FIGS. 5, 6, and 7.

A simplified run of the processes shown in FIGS. 5, 6, and 7 will now be described with respect to the flowchart of FIG. 4. First, a determination is made regarding whether to provide credit card sub-accounts, step 80. If No, the process ends. If Yes, creation of sub-accounts associated with an account holder's existing account is enabled, step 81. The creation of sub-accounts can be performed by an account holder, step 82, or performed on behalf of an account holder, step 83. Transactions are consolidated for sub-accounts and account, step 84. A transaction limit is configured for sub-accounts, step 85, and can be an exact amount, a percentage of the total available credit limit for the account, a percentage of total available credit, or a combination thereof. Also, a user can establish transaction limits and restrictions based upon types of establishments and/or types of products and services. An attempt to perform a transaction that is restricted may be overridden by the account holder. Account and sub-account transactions are stored, step 86, and then presented to the account holder and sub-account holder, step 87.

Figure 5:
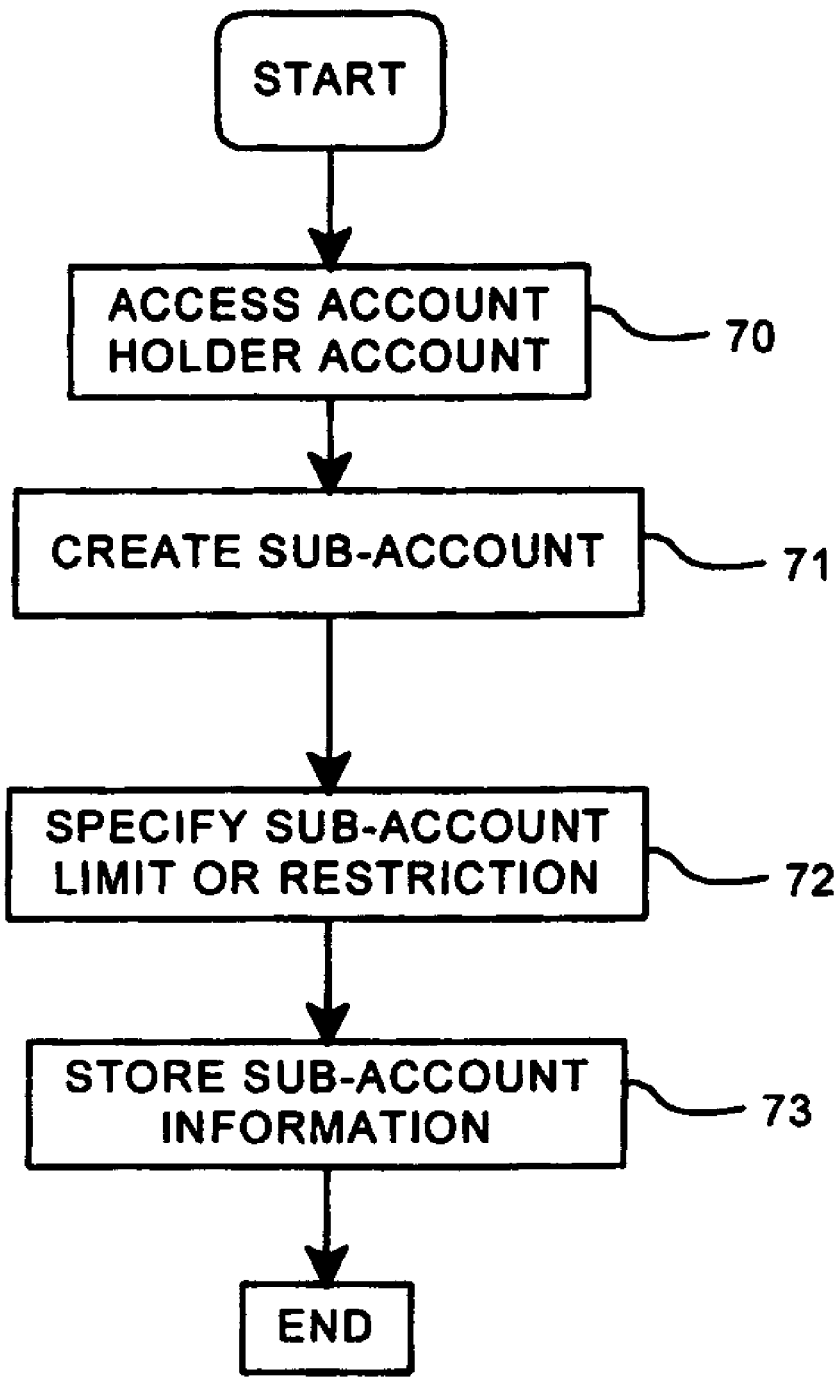
FIG. 5 is an illustrative flowchart describing the creation and setting up of banking sub-accounts of the present invention.

FIG. 5 is a flowchart showing the development of a process according to the present invention for creating and setting up banking sub-accounts. First, the account holder accesses the original account, step 70, in order to create a sub-account, step 71. A sub-account can be set up for an account holder's child or dependent. As transactions are made against the sub-account, the net balance of the sub-account is reflected in the banking account holder's bank statement. Sub-account holders could establish a credit history because their individual transactions would be traceable. The account holder specifies whether a limitation or restriction will be associated with the newly created sub-account, step 72, and exactly what that limitation or restriction is. The sub-account information is stored in an account database, step 73. Then the process ends.

Figure 6:
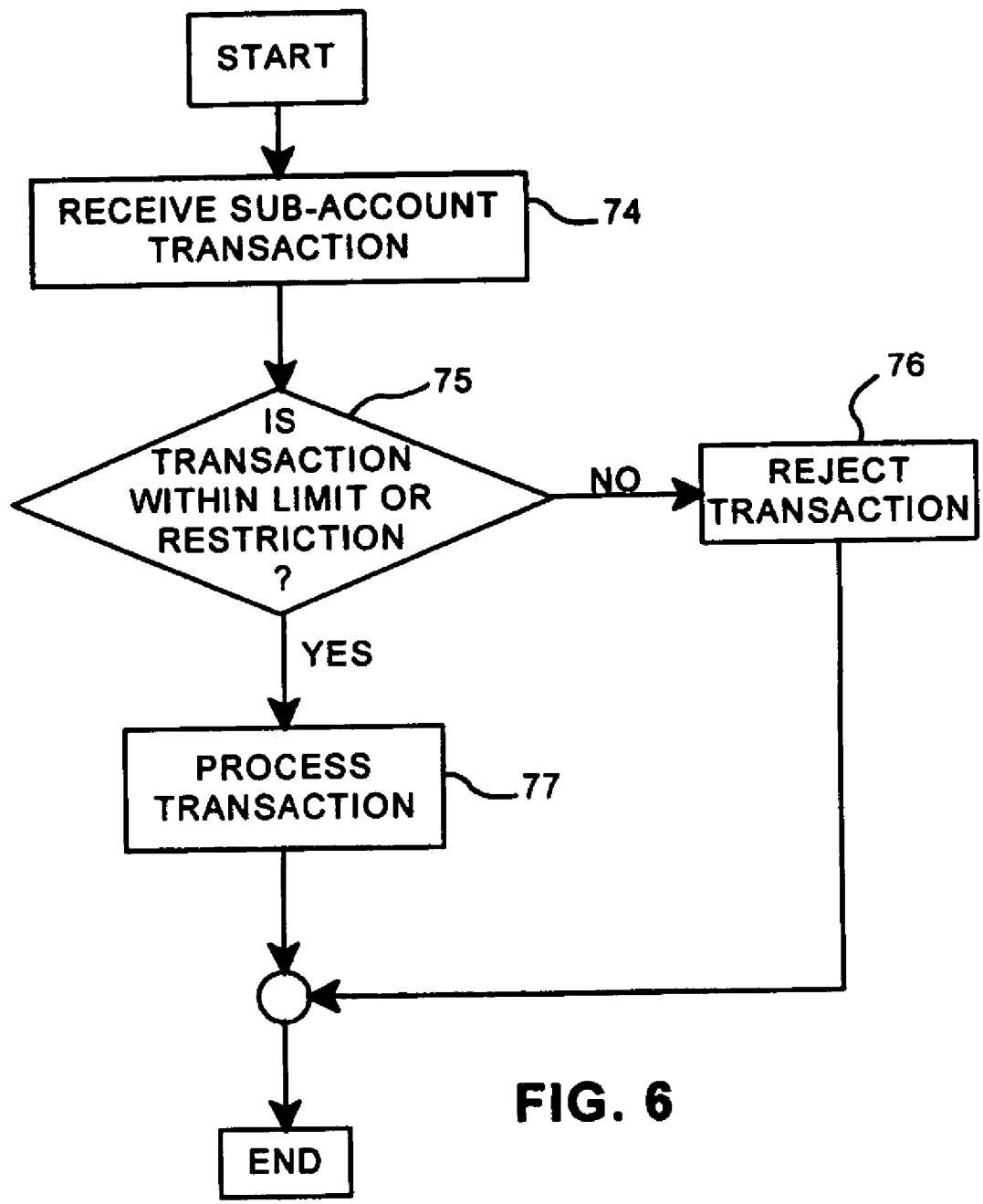
FIG. 6 is an illustrative flowchart describing sub-account transaction processing of the present invention.

FIG. 6 shows an illustrative flowchart describing sub-account transaction processing as shown in FIG. 3. The sub-account transaction is received, step 74. A determination is made regarding whether the transaction is within a predetermined limit or restriction associated with the account, step 75. If No, the transaction is rejected, step 76, and the process ends. If Yes, the transaction is processed, step 77, and the process ends.

Figure 7:
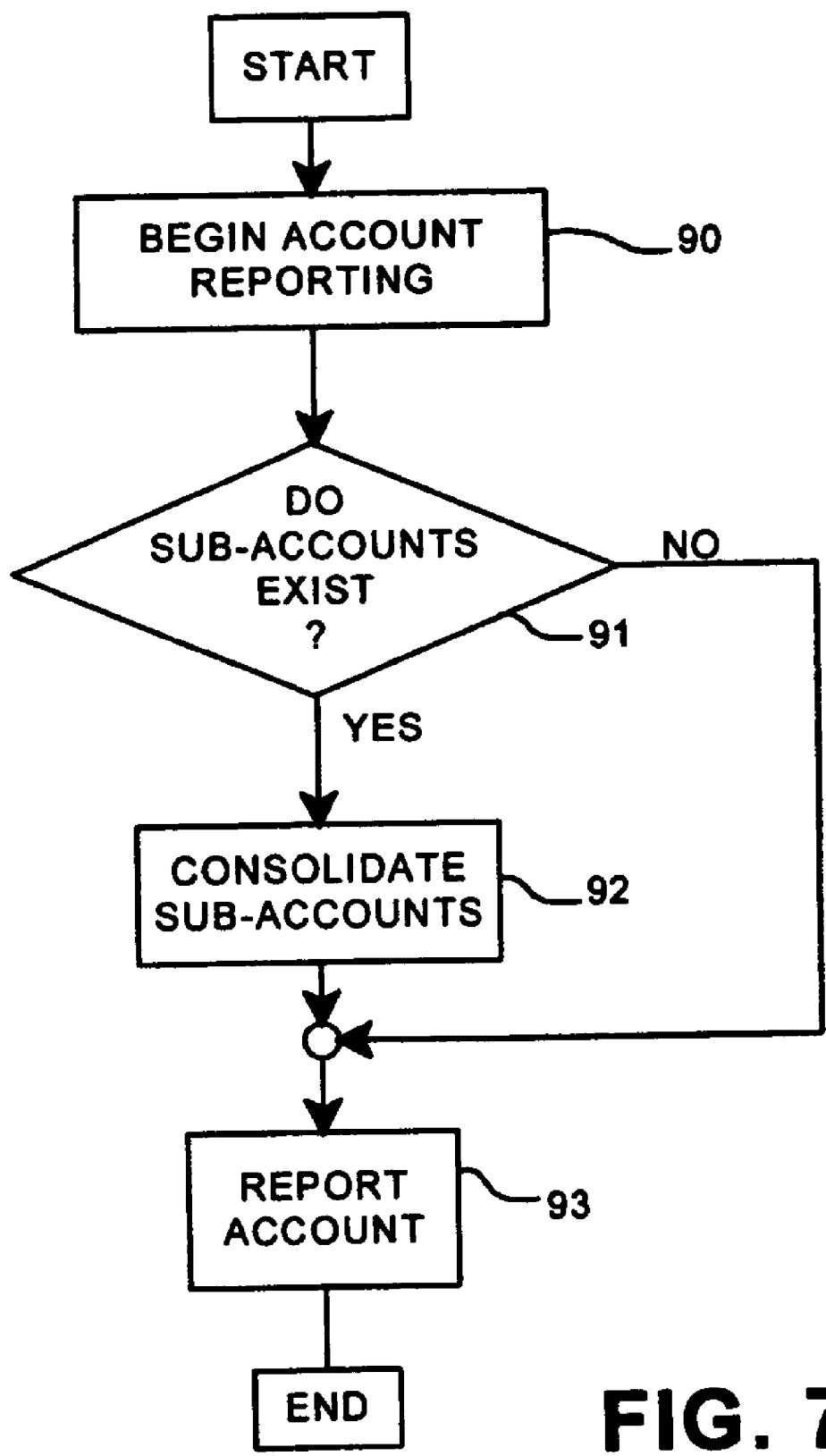
FIG. 7 is an illustrative flowchart describing account and sub-account reporting of the present invention.

FIG. 7 is an illustrative flowchart describing account reporting of the present invention. Account reporting begins, step 90. Then a determination is made regarding whether sub-accounts exist, step 91. If No, the account report is generated to the account holder, step 93, and the process ends. If Yes, sub-accounts related to the original account are consolidated, step 92, and the account report is generated to the account holder, step 93. Then the process ends. The presentation of the stored transactions can be sent to the account holder via regular mail, or electronic means, and can be on a regular basis, such as with a monthly statement. Said presentation can also occur in the form of an alert to an account holder of one attempted violation by a sub-account holder of transaction limitations, frequent use of a credit card by a sub-account holder, e.g. numerous transactions, or unusually high transaction amounts on a credit card by a sub-account holder.

One of the preferred implementations of the present invention is an application program 41 made up of programming steps or instructions resident in RAM 14, FIG. 2, during computer operations. Until required by the computer system, the program instructions may be stored in computer readable medium, e.g. disk drive 20, or in a removable memory such as an optical disk for use in a CD ROM computer input or in a floppy disk for use in a floppy disk drive computer input. One skilled in the art would appreciate that the processes controlling the present invention are capable of being distributed as a program product in the form of computer readable media of a variety of forms.

Although certain preferred embodiments have been shown and described, it will be understood that many changes and modifications may be made therein without departing from the scope and intent of the appended claims.

The invention claimed is:

1. A computer implemented method for providing sub-accounts on a credit card to a banking account holder, comprising:
   enabling creation of credit card sub-accounts of an existing credit card or banking account;
   creating at least one sub-account of the existing credit card or banking account sub-account holder having at least a first limit;
   specifying limitations on types of vendors used by at least one of the sub-accounts; and
   consolidating transactions for said at least one sub-account and said account;
   wherein the account holder can opt to be the only recipient of account information for the account and sub-accounts;
   wherein the creation of sub-accounts can be by the account holder or performed on behalf of the account holder by a third party;
   wherein at least one transaction limit for the at least one sub-account is configured;
   wherein a message alert is sent to the account holder when a sub-account holder attempts to violate the transaction limits informing the account holder of the attempted transaction;
   wherein an attempt to perform a transaction that is restricted may be overridden by the account holder;
   wherein transactions are stored for the account holder;
   wherein the stored transactions are presented to the account holder and the at least one sub-account holder electronically;
   wherein the presentation of the stored transactions can be in the form of an alert to the account holder of an attempted violation by a sub-account holder of transaction limitations;
   wherein the alert can include information regarding frequent use of a credit card by a sub-account holder.

2. A computer implemented system for providing banking sub-accounts on a credit card to a banking account holder, the system comprising:
   means for enabling creation of credit card sub-accounts of an existing credit card or banking account;
     wherein said enabling means includes a CPU;
     wherein said CPU interconnects with an operating system;
   means for creating at least one sub-account of the existing credit card or banking account sub-account holder having at least a first limit;
   means for specifying limitations on types of vendors used by at least one of the sub-accounts; and
   means for consolidating transactions for said at least one sub-account and said account;
   wherein the account holder can opt to be the only recipient of account information for the account and sub-accounts;
   wherein the creation of sub-accounts can be by the account holder or performed on behalf of the account holder by a third party;
   wherein at least one transaction limit for the at least one sub-account is configured;
   wherein a message alert is sent to the account holder when a sub-account holder attempts to violate the transaction limits informing the account holder of the attempted transaction;

wherein an attempt to perform a transaction that is restricted may be overridden by the account holder;

wherein transactions are stored for the account holder;

wherein the stored transactions are presented to the account holder and the at least one sub-account holder electronically;

wherein the presentation of the stored transactions can be in the form of an alert to the account holder of an attempted violation by a sub-account holder of transaction limitations;

wherein the alert can include information regarding frequent use of a credit card by a sub-account holder.

3. A computer program having code recorded on a computer readable medium for providing sub-accounts on a credit card to a banking account holder, comprising:

enabling creation of credit card sub-accounts of an existing credit card or banking account;

creating at least one sub-account of the existing credit card or banking account sub-account holder having at least a first limit;

specifying limitations on types of vendors used by at least one of the sub-accounts; and consolidating transactions for said at least one sub-account and said account;

wherein the account holder can opt to be the only recipient of account information for the account and sub-accounts;

wherein the creation of sub-accounts can be by the account holder or performed on behalf of the account holder by a third party;

wherein at least one transaction limit for the at least one sub-account is configured;

wherein a message alert is sent to the account holder when a sub-account holder attempts to violate the transaction limits informing the account holder of the attempted transaction;

wherein an attempt to perform a transaction that is restricted may be overridden by the account holder;

wherein transactions are stored for the account holder;

wherein the stored transactions are presented to the account holder and the at least one sub-account holder electronically;

wherein the presentation of the stored transactions can be in the form of an alert to the account holder of an attempted violation by a sub-account holder of transaction limitations;

wherein the alert can include information regarding frequent use of a credit card by a sub-account holder.

\* \* \* \* \*